M. L. JENKINS.
FRICTION DRIVING MECHANISM.
APPLICATION FILED MAR. 20, 1912.
1,110,793.
Patented Sept. 15, 1914.
3 SHEETS—SHEET 2.
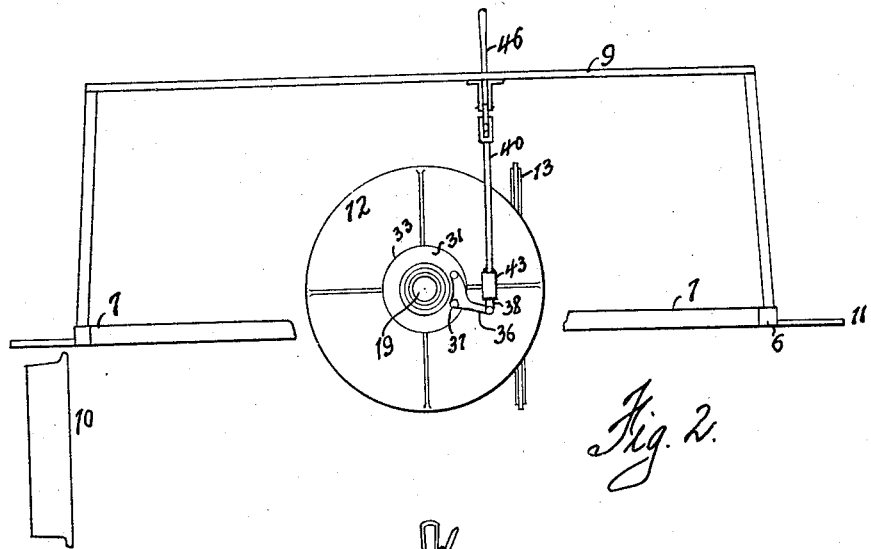
Fig. 2.
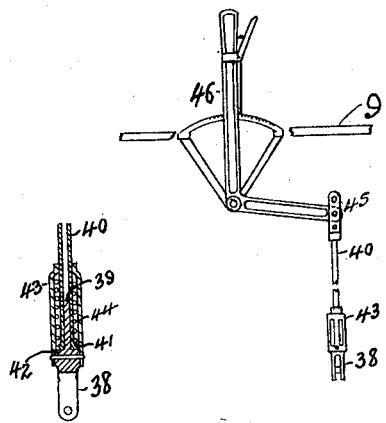
Fig. 4.
Fig. 3.
WITNESSES:
W. Herbert Fowkes.
M. H. Erickson.
INVENTOR
Merrill L. Jenkins
by atty
Paul Synnestvedt.

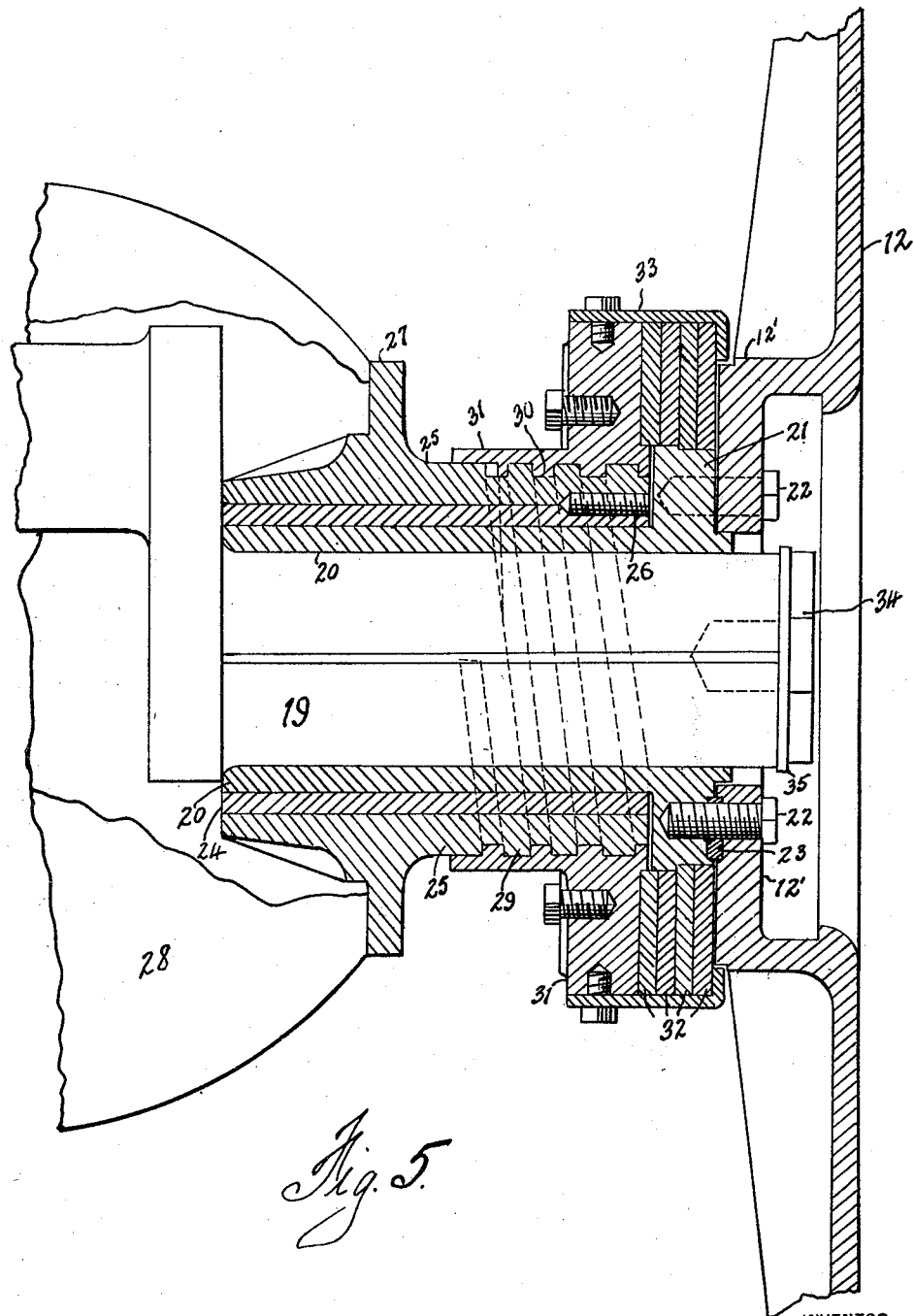

UNITED STATES PATENT OFFICE.

MERRILL L. JENKINS, OF HARVEY, ILLINOIS, ASSIGNOR TO BUDA COMPANY, OF CHICAGO, ILLINOIS, A CORPORATION OF ILLINOIS.

FRICTION DRIVING MECHANISM.

1,110,793.  Specification of Letters Patent.  Patented Sept. 15, 1914.

Application filed March 20, 1912. Serial No. 685,100.

*To all whom it may concern:*

Be it known that I, MERRILL L. JENKINS, a citizen of the United States, residing at Harvey, in the county of Cook and State of Illinois, have invented certain new and useful Improvements in Friction Driving Mechanism, of which the following is a specification.

My invention relates generally to improved transmission mechanism for use in motor vehicles, such as for example railway tracks cars or the like. It has for its principal objects the provision of a driving friction disk having longitudinal movement for engagement with and disengagement from a driven wheel; the provision of improved means imparting longitudinal movement to a friction disk for frictional contact with a driven wheel; the provision of a novel shift thrust mechanism adapted to effect contact between transmission members and a thrust bearing between the thrust mechanism and the movable member; the provision of a friction disk mounted on a driving shaft having positive rotation therewith and reciprocative movement thereon; and the provision of means adapted to afforded uniform pressure and prevent jamming between friction members brought into contact.

These and such other objects as may hereinafter appear or are incident to my invention, I attain by means of a construction illustrated in preferred form in the accompanying drawings, wherein:—

Figure 2 is a sectional view through the line II—II of Figure 1.

Figure 3 is a side elevation of the operating mechanism.

Figure 4 is an enlarged detail of Figure 3.

Figure 5 is a section through the shift thrust mechanism.

Figure 1:
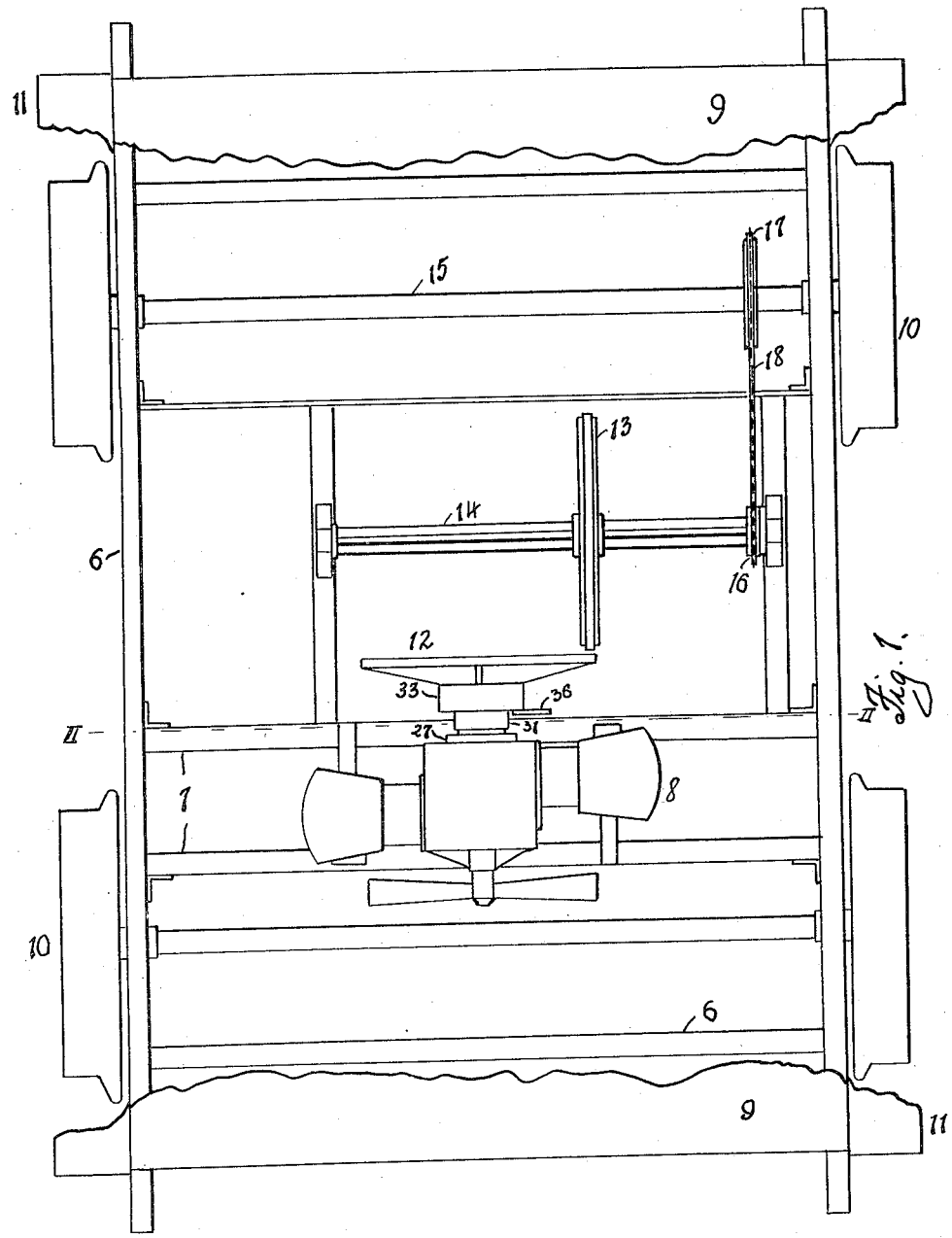
Figure 1 is a plan view of the chassis of the track car provided with my improved mechanism.

In carrying out my invention as disclosed in the drawing and shown applied to a railway track car, I provide the frame 6 in which the wheels 10 are mounted and which carries the platform 9 and outboard 11. The motor 8 is supported by the cross-pieces 7 rigidly secured to the frame 6 of the track car.

The driving mechanism comprises a friction driving disk 12, adapted to engage with its face the periphery of a driven friction wheel 13, the latter being shiftably mounted on the splined jack shaft 14 for movement from and toward the center of the disk 12. The rear axle 15 is driven in the usual manner from the shaft 14 through the media of the sprockets 16 and 17 and the drive chain 18.

The friction or driving disk 12 is provided with a hub portion 12' and is mounted for reciprocative movement on the shaft 19 and brought into and out of engagement with the driven wheel 13 by means of the shift thrust mechanism clearly shown in Figure 5 and to which reference is now more particularly made.

Fitted over the squared end of the motor shaft 19 is a cylindrical sleeve 20, correspondingly shaped internally to permit rotation of the sleeve with the shaft. The sleeve 20 is provided at its forward end with an annular flanged portion 21, to the face of which is rigidly secured the hub portion 12' of the friction disk 12, by means of the cap screws 22. Through this arrangement the driving disk has rotative movement with the shaft. Any undue stress placed upon the cap screws is overcome by means of the sheer washers 23, through which the cap screws pass, and which rest in corresponding recesses in the flange 21 and hub portion 12' of the disk.

Positioned about the sleeve 20 and to the rear of the flange 21 is a stationary bearing member 25, having a portion of its length externally threaded as at 29, and provided with a rear flange 27 secured to the forward end of the crank case 28. Between the stationary member 25 and the sleeve 20 is a bushing 24 affording a bearing for the sleeve, and fastened by a set screw 26 to the member 25, so that when the sleeve is given forward movement on the shaft to effect an engagement between the disk and wheel, the bushing is held against movement therewith. The numeral 31 indicates a shift member or collar interiorly threaded as at 30 and mounted for turning movement on the externally threaded portion 29 of the stationary member 25 intermediate the flanges 21 and 27 as in Figure 5. I preferably form the collar 31 with a rearwardly extending hub portion terminating at a point short of the flange 27, in order to afford a greater bearing surface between the threaded portions 29 and 30.

One of the important features of my invention is the interposition of means between the shiftable member 31 and the disk 12, provided partly to afford a thrust bearing between the parts when advanced to operative position, but which is further designed to provide an effective means for returning the disk to its normal position as in Figure 5; with a minimum of wear to parts. In the form of construction as shown, the thrust bearing above referred to comprises a series of movable rings 32 peripherally carried on the sleeve flange 21, one or more of which are fitted on to the slightly smaller diametered forward portion thereof. The shift member 31 is provided with an annular casing or housing 33 flanged to engage the outer ring, whereby the ring coöperates with the shift member when the latter is reversed, carrying with it the flanged sleeve and the disk, as will be readily understood from an inspection of the drawings.

The squared end of the shaft 19 is cored and threaded for the reception of a cap screw 34 which holds the washer 35 in position at the end of the shaft. This washer having a larger diameter than the shaft limits the movement of the sleeve 20 on actuation toward operative position.

Figures 2 to 4 inclusive disclose the operating means for actuating the shift thrust mechanism which brings the friction members into and out of contact. A thrust lever 36 is secured by the set screws 37 to the inner face of the flange 31, and the free end of the said lever fits easily into a forked member 38. This fork 38 is provided with an integral finger 39 which projects into a hollow connecting rod 40, the latter being provided with an enlarged portion 41 at its lower extremity which abuts the shoulder 42 of the forked member 38. Secured to the latter is a cage 43 which is also positioned about the lower end of the rod 40 and incloses a tension spring 44 arranged around that portion of the rod within the cage, the said spring taking against the enlarged portion 41 and the conoidal end of the cage. At the upper end of the rod 40 is a knuckle 45 furnishing an adjustable connection between the rod and the operating or starting lever 46 which is positioned in the platform 9.

The operation of my invention is substantially as follows: Normally the friction disk is out of engagement with the driven wheel, and on actuation of the operating lever 46 from its normal position a downward movement is imparted to the thrust lever 36, which communicates a shifting movement to the shift collar 31.

This movement is imparted to coöperating ring 32 within the casing 33, and also to the annular flange 21 of the sleeve 20, inasmuch as the direction of the threaded collar 31 is governed by the threads 29 on the stationary bearing 25. Pressure is thus exerted by these said members and brought to bear against the hub of the disk 12 bringing the disk into engagement with the driven wheel 13. In its forward movement the disk 12 carries with it the sleeve 20; the stop washer 35 serving as a limitation in this change of position. Relative movement of the sleeve is not communicated to the bushing 24, as the latter is secured to the stationary bearing 25 in the manner already set forth. Reversing the lever returns the disk to its normal position through the pressure brought to bear by the outer ring or rings against the larger diametered portion of the sleeve flange 21.

The sleeve 25 may be provided with left-hand threads 29, and with the crank shaft rotating in a right-hand direction, the disengagement of the disk from the wheel is materially assisted and shock lessened when the operating lever is reversed.

Jamming friction between the disk and wheel when engaged, is overcome through the interposition of the spring in the lever mechanism, thereby tending to obtain a more uniform pressure between these members, dissipating the shock and jar usually present in transmissions of this character. Other advantages will be readily perceived by those skilled in the art.

Having thus described my invention and illustrated its use what I claim as new and desire to secure by Letters Patent is the following:—

1. The combination with a shaft, of a sleeve on the shaft provided with a flange portion, a disk carried by the flanged sleeve, means for advancing and retracting the said disk comprising an internally threaded movable member about the sleeve and a stationary threaded member interposed therebetween, with means fitting about the said flanged portion and in coöperative relation with the said shift member.

2. In a motor vehicle, the combination of a motor, a shaft therefor, a friction driving disk slidably mounted on the shaft, a driven wheel, means for moving the driving disk into and out of engagement with the driven wheel comprising a shift member and one or more movable rings interposed between the shift member and the driving disk.

3. The combination with a motor and its shaft, of a driven wheel, a driving disk on said shaft, means about said shaft for advancing the disk relatively of the shaft to engage the wheel, said means comprising a bearing member flanged for purposes of attachment to the motor casing whereby it is held against communicated movement, and a thrust device turnable on said bearing member to advance the disk.

4. In combination, a shaft, a driving disk slidably mounted on the shaft, a driven wheel, means to move the driving disk relatively of the shaft into and out of driving engagement with the driven wheel comprising a shift member positioned to the rear of the disk and a thrust bearing interposed therebetween and coöperating with the shift member to advance and retract the disk, substantially as described.

5. In a motor vehicle, the combination of an engine, a shaft therefor having a squared end, a bearing member, a sleeve mounted on the squared end of the shaft within the bearing member, a driving disk carried by the sleeve, a driven wheel, a shift member mounted on the bearing member adapted to move the driving disk into and out of engagement with the driven wheel, a plurality of relatively movable members mounted on the sleeve between the shift member and the driving disk, and a casing mounted on the shift member and inclosing the plurality of movable members.

6. In a motor vehicle, the combination of an engine, a shaft therefor having a squared end, a bearing member, a sleeve mounted on the squared end of the shaft within the bearing member, a driving disk carried by the sleeve, a driven wheel, a shift member mounted on the bearing member adapted to move the driving disk into and out of engagement with the driving wheel, a plurality of relatively movable members mounted on the sleeve between the shift member and the driving disk, a casing mounted on the shift member and inclosing the plurality of movable members, and means for moving the shifting member.

7. In a device of the character described, the combination of a driven wheel, a drive shaft, a rotary driving disk on said shaft, means about the shaft for advancing the disk relatively of said shaft to engage the wheel comprising a bearing member and a movable member, said movable member being capable of having turning movement on the bearing member relative the axis of the shaft and in a direction opposed to that of the disk, and means for actuating the movable member.

8. In a motor vehicle, the combination of a driven wheel, a drive shaft, a driving disk rotative with the shaft and movable longitudinally thereof into and out of engagement with the driven wheel, and a thrust mechanism for moving the disk into and out of engagement with the wheel, said mechanism comprising relatively fixed and movable members, and an antifriction element interposed between the said movable member and the disk and capable of engaging the disk to retract it to disengaged position.

9. The combination in a motor vehicle with a frame and an engine mounted therein; of a driving shaft, an exteriorly threaded bearing member, a sleeve on the shaft and rotatable therewith, a driving disk mounted on the sleeve, a driven disk, a bushing between the sleeve and the bearing member, a collar having a threaded internal portion engaging with the threaded bearing member, bearing members on the sleeve between the collar and the driving disk, and a casing for the bearing members mounted on the collar.

10. In a transmission mechanism, the combination of a driven wheel, a drive shaft, a rotary driving disk on said shaft, means for shifting said disk to engage the wheel and movable in a direction opposed to that of the disk, and actuating means for said last mentioned means comprising a fixed arm, an operating lever, and a yielding connection interposed therebetween, so arranged whereby to prevent jamming friction and obtain an uniform pressure between the driving and driven member when in engagement.

11. In a motor vehicle, the combination of an engine, a shaft therefor, a bearing member provided with threads, a sleeve mounted on the end of the shaft and fitting the interior of the bearing member, a driving disk carried by the sleeve, a driven wheel, and a threaded shift member engaging the threaded bearing member adapted to move the driving disk into and out of engagement with the driven wheel substantially as described.

12. In a motor vehicle, the combination of an engine, a shaft therefor, a bearing member provided with threads, a sleeve mounted on the end of the shaft and fitting the interior of the bearing member, a driving disk carried by the sleeve, a driven wheel, a threaded shift member engaging the threaded bearing member and adapted to move the driving disk into and out of engagement with the driven wheel, coöperating with a thrust bearing interposed between the shift member and the driving disk.

13. In a motor vehicle, the combination of an engine and a shaft therefor, a bearing member, a sleeve slidably mounted for relative movement on the end of the shaft and fitting within the bearing member, a driving disk carried by the sleeve, a driven wheel, and a shift member mounted for movement on the bearing member and provided with a ring fitting the sleeve adapted to move the driving disk out of engagement with the driven wheel.

14. In a motor vehicle, the combination of an engine and a shaft therefor, a bearing member, a sleeve slidably mounted on the end of the shaft and fitting within the bearing member, a driving disk carried by the sleeve, a driven wheel and a shift member mounted for movement on the bearing member and adapted to move the driving disk into engagement with the driven wheel, and stop means on the shaft adapted to limit the movement of the friction disk to operative position.

15. In a motor vehicle, the combination of a drive shaft, a driven wheel, a driving disk rotatable with the shaft and movable thereon toward and from the driven wheel for engagement and dis-engagement therewith, and a thrust mechanism for moving the driving disk out of engagement with the wheel, comprising an operating member and one or more slip plates engaging the disk and retractible by the said member.

16. In a motor vehicle, a drive shaft and a driven wheel, a sleeve movable on said shaft, a disk carried by said sleeve and revoluble with the shaft, means for moving the disk into and out of engagement with the wheel, comprising a movable operating member and an anti-friction element carried by the said member, the said element being so arranged with respect to the sleeve and disk that on actuation of the operating member in one direction it bears against the disk to advance it, and on actuation of the operating member in another direction it engages the sleeve to retract the disk to dis-engaged position.

17. In combination, a driven wheel, a drive shaft, a driving disk having a sleeved hub portion slidable on said shaft, and a means for moving the disk into and out of engagement with said wheel comprising an inner bearing member about the sleeve, an outer member turnable on said bearing member, and an anti-friction element carried by the outer member to engage the said hub portion to retract the disk.

In testimony whereof I have hereunto signed my name in the presence of the two subscribed witnesses.

MERRILL L. JENKINS.

Witnesses:
F. E. PLACE,
L. C. CURL.

---

Copies of this patent may be obtained for five cents each, by addressing the "Commissioner of Patents, Washington, D. C."